(12) United States Patent
McIntyre

(10) Patent No.: US 7,080,667 B2
(45) Date of Patent: Jul. 25, 2006

(54) LINED PIPELINE VENT

(75) Inventor: Stuart McIntyre, Aberdeen (GB)

(73) Assignee: Boreas Consultants Limited, Aberdeen (GB)

( * ) Notice: Subject to any disclaimer, the term of this patent is extended or adjusted under 35 U.S.C. 154(b) by 0 days.

(21) Appl. No.: 10/399,202

(22) PCT Filed: Oct. 12, 2001

(86) PCT No.: PCT/GB01/04546

§ 371 (c)(1),
(2), (4) Date: Dec. 1, 2003

(87) PCT Pub. No.: WO02/33298

PCT Pub. Date: Apr. 25, 2002

(65) Prior Publication Data

US 2004/0074551 A1 Apr. 22, 2004

(30) Foreign Application Priority Data

Oct. 14, 2000 (GB) ................................ 0025301.3

(51) Int. Cl.
*F16L 55/00* (2006.01)
(52) U.S. Cl. ...................... 138/104; 138/114; 138/98
(58) Field of Classification Search ................ 138/104, 138/97, 98, 112, 114
See application file for complete search history.

(56) References Cited

U.S. PATENT DOCUMENTS

| | | | | |
|---|---|---|---|---|
| 3,435,852 A | * | 4/1969 | Trihey | 138/122 |
| 3,903,928 A | * | 9/1975 | Sykes et al. | 138/109 |
| 4,100,940 A | | 7/1978 | Spears | |
| 4,163,474 A | * | 8/1979 | MacDonald et al. | 165/179 |
| 4,756,339 A | * | 7/1988 | Buluschek | 138/115 |
| 4,934,654 A | * | 6/1990 | Linnemann | 251/144 |
| 4,950,103 A | * | 8/1990 | Justice | 405/43 |
| 5,497,807 A | * | 3/1996 | Rogers | 138/98 |
| 5,520,484 A | * | 5/1996 | Kamiyama et al. | 405/184.2 |
| 5,603,358 A | * | 2/1997 | Lepoutre | 138/149 |
| 5,791,378 A | * | 8/1998 | Stephens | 138/98 |
| 6,311,772 B1 | * | 11/2001 | Myhre et al. | 166/278 |
| 6,634,387 B1 | * | 10/2003 | Glejbol | 138/104 |
| 6,634,388 B1 | * | 10/2003 | Taylor et al. | 138/114 |

FOREIGN PATENT DOCUMENTS

| | | | |
|---|---|---|---|
| GB | 2115103 | | 9/1983 |
| WO | WO 98/17938 | | 4/1998 |
| WO | WO 00/08368 | | 2/2000 |
| WO | WO 00/17479 | * | 3/2000 |

OTHER PUBLICATIONS

PCT/GB01/04546 International Search Report Feb. 15, 2002.

* cited by examiner

*Primary Examiner*—James Hook
(74) *Attorney, Agent, or Firm*—Kirkpatrick & Lockhart Nicholson Graham LLP

(57) ABSTRACT

The present invention relates to apparatus for use in venting pipelines that have a plastic lining such as these used for transporting hydrocarbon fluids. A pipeline assembly comprises a pipeline (2), a corrosion resistance liner (3), and a micro-annulus (4) located between said pipeline and liner. The pipeline assembly also comprises a venting means (5) adapted for fitment in or through the corrosion resistance liner (3), wherein the venting means (5) allows gas to flow from the micro-annulus into the center of the pipeline assembly but not in the opposing direction.

20 Claims, 2 Drawing Sheets

LINED PIPELINE VENT

CROSS-REFERENCE TO RELATED APPLICATIONS

Figure 1:
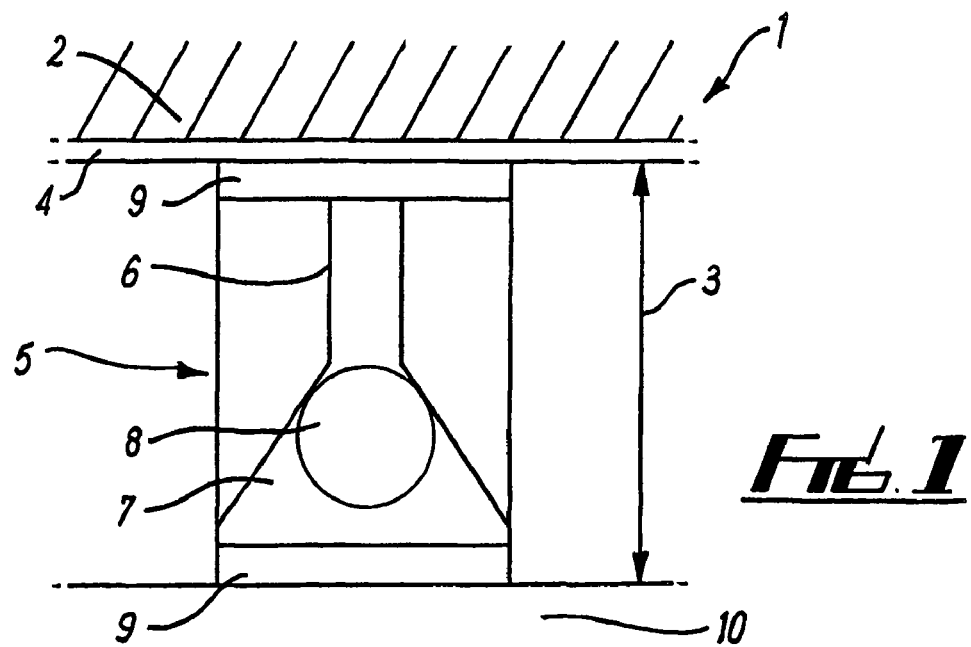

This application is the national phase of International (PCT) Patent Application Ser. No. PCT/GB01/04546, filed Oct. 12, 2001, published under PCT Article 21(2) in English, which claims priority to and the benefit of British Patent Application No. 0025301.3, filed Oct. 14, 2000, the disclosures of which are incorporated herein by reference.

The present invention relates to apparatus for use in venting pipelines that have plastic lining. In particular the present invent ion relates especially but not exclusively to plastic lined pipelines used for transporting hydrocarbon fluids.

Pipelines employed in the oil production industry are commonly used to carry aggressive and corrosive hydrocarbon fluids. This is problematic as pipelines of this type are often run at considerable depths and it is both costly and time consuming to repair and replace any damage which may occur as a result of corrosion of the pipeline. Unfortunately, corrosion resistant materials are very expensive and hence undesirable for manufacturing pipeline, which may be hundreds of meters in length.

There are therefore considerable cost benefits in using Carbon Steel pipelines lined with cheap corrosion resistant liner. Indeed a number of plastics material liners have previously been proposed and are commonly used in process plant pipework. Although effective for this purpose, the materials used in process plant pipework systems are not suited for use in petrochemical pipelines as they are typically supplied in short lengths that are flanged rather than welded and operate at near ambient temperatures and low pressures. They are therefore not suitable for hydrocarbon pipelines which are subject to hostile chemical and pressure conditions.

In applications where non-hydrocarbon pipelines, which carry fluids with no gaseous content, are lined by a plastic liner, it is typical to weld together significant lengths of the steel pipeline and then to pull a continuous plastics material pipe into the steel pipe to form an inner lining. This is achieved by swaging or squeezing the plastic material between rollers to make it temporarily smaller such that it fits within; the pipeline in a loose fit. When the plastic material relaxes, or is expanded, it achieves a close fit with the steel pipeline. However there is no physical bond between the pipeline and the plastic liner and as a consequence a small micro-annulus exists between the two.

The plastic materials used are typically slightly permeable. As a result, small gas molecules permeate out of the fluid stream in the pipeline and pressurise the micro-annulus between the steel pipeline and inner plastic liner. During normal operational practices fluid pressure in the pipeline fluctuates over time. When this fluctuation is a pressure drop the gas trapped in the annulus expands and collapses the liner, which can not be re-flated thereafter without damage.

This invention relates to improvements to our earlier British Patent Application Number 9817223.2 which teaches of a venting apparatus for use in a plastic lined pipeline. The venting apparatus is fitted in the pipeline wall and comprises a through-hole to allow gas to be vented out of the pipeline, and a porous element. The porous element acts as a barrier to prevent the liner deforming under pressure and clogging the through-hole.

Whilst this apparatus prevents the annulus from becoming pressurised and therefore allows plastic lined pipelines to be used for hydrocarbons, it is appreciated in the present invention that it would be a distinct advantage to provide a vent device which allows gas to flow back into the flowline, as opposed to a vent device which vents gas to the surroundings. It is appreciated that in a number of circumstances it may be undesirable for the gas contents of the fluid to be vented to the outside of the pipeline, both from a safety and a commercial perspective. In addition, by preventing emissions from the pipeline, and retaining gas therein, the micro-annulus between the pipeline and liner will not be exposed to the external environment and potentially corrosive materials and as a consequence corrosion of the pipeline will be controlled. Similarly the liner is not exposed to any external ambient pressure which may also lead to collapse.

It is therefore an object of the present invention to provide a venting apparatus, which prevents the annulus between a pipeline and plastic liner from becoming pressurised. In particular it is an object of the present invention to provide a venting apparatus which does not rely on emitting gas from the pipeline and therefore protects the annulus between the pipeline and plastic liner from excessive exposure to corrosive material.

According to the present invention there is provided a pipeline assembly comprising a pipeline, a corrosion resistant liner, and a micro-annulus located between said pipeline and liner, wherein the pipeline assembly also comprises a venting means extending through the corrosion resistant liner, wherein the venting means allows gas to flow from the micro-annulus into the centre of the pipeline assembly.

Preferably the liner is made from plastic.

In a preferred embodiment the venting means is inserted through an aperture in the plastic liner. However, in an alternative embodiment the venting means is retained by a shoulder in the wall of the plastic liner.

Preferably the venting means is a pre-fabricated assembly.

The venting means may be retained in the plastic liner by threading, gluing or fusing.

Optionally the venting means has check means for regulating fluid flow.

Said check means may be, for example, a sintered metal, a sintered wire mesh, a ceramic material or a stainless steel wire mesh. The check means can also be made from various plastics and composite materials such as PEEK (Poly Ether Ether Ketone) alloyed with Teflon (PAT).

Optionally, the venting means includes non-return valve means.

The non-return valve means may comprise a spring biased ball valve assembly.

Optionally the valve assembly comprises a moveable member which is moveable between a first and second position, wherein the moveable member is in the first position when the pressure within the pipeline exceeds a set level, and wherein the moveable member is in the second position when the pressure within the pipeline falls below said set level.

In the first position the moveable member prevents the pipeline contents from exiting the pipeline.

In the second position the moveable member permits the flow of gas into the pipeline.

Optionally the venting means may comprise a reed value arrangement formed directly in the liner.

In an alternative embodiment a sleeve member extends circumferentially around the liner and longitudinally on either side of the venting means so as to define a lengthened venting path between the micro annulus and the centre of the pipeline assembly.

Figure 2:
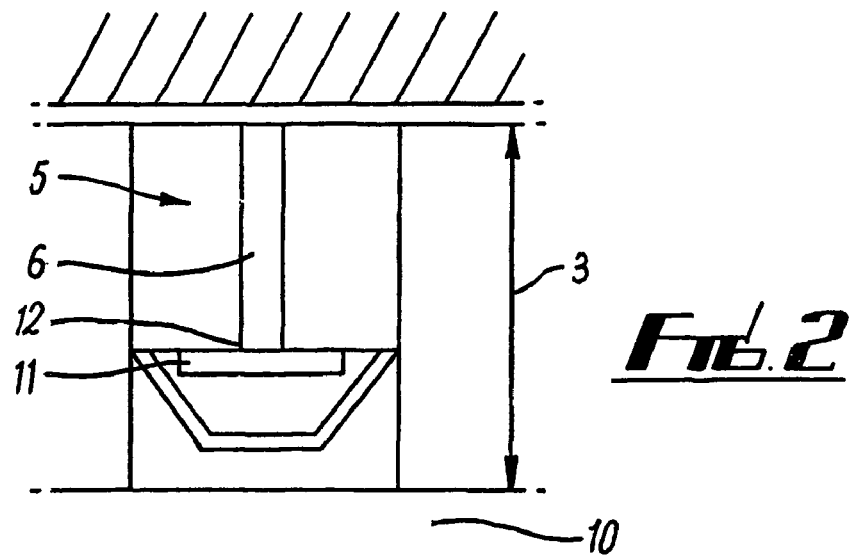
Figure 3:
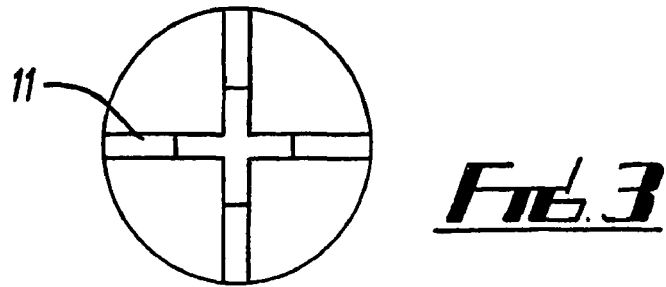
Figure 4:
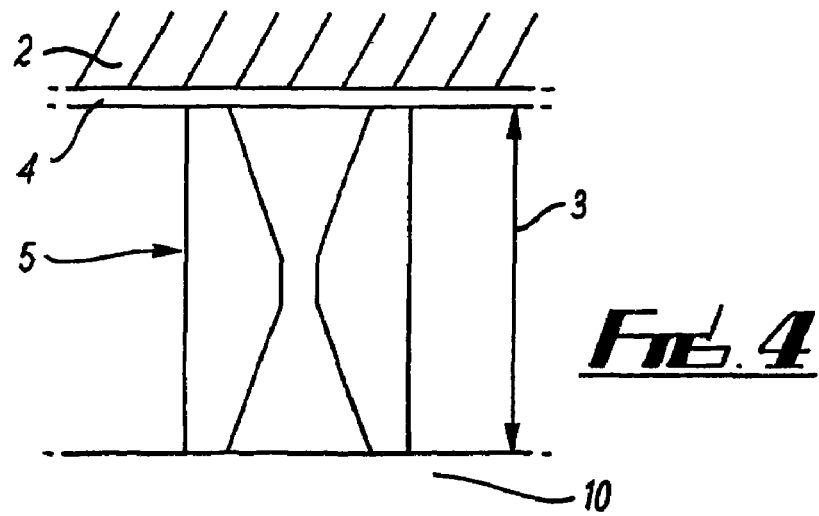
Figure 5:
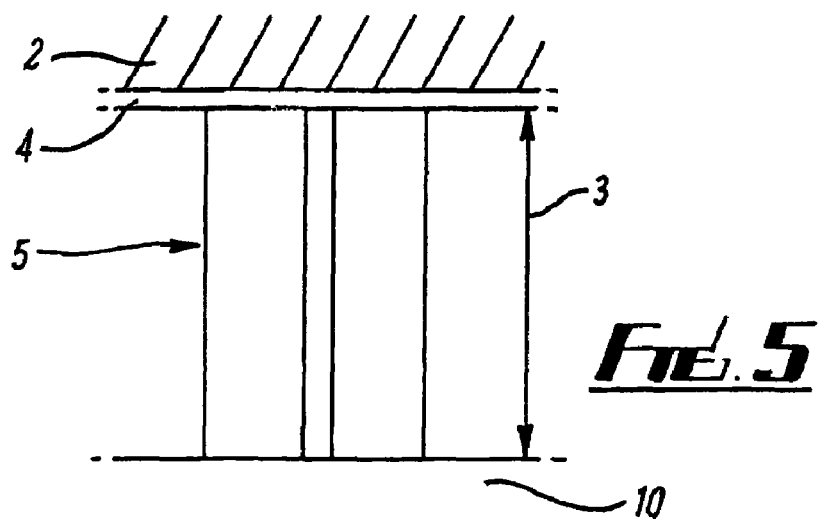
Figure 6:
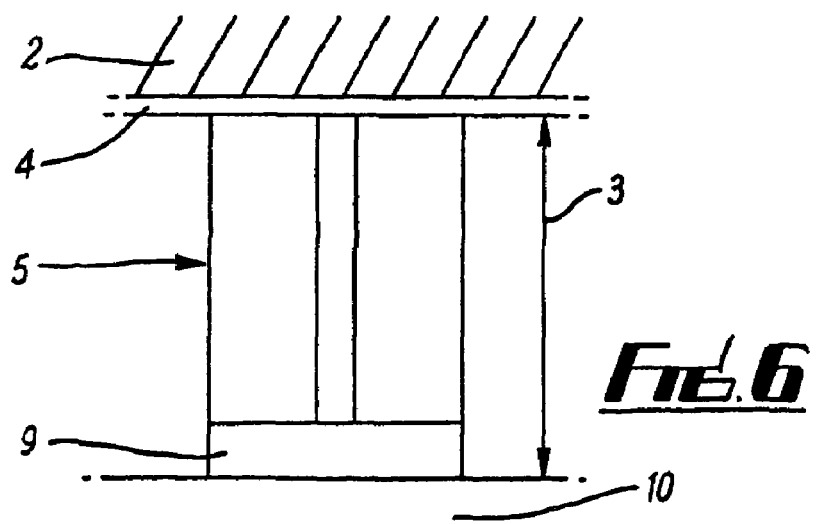

Embodiments of the present invention will now be described by way of example with reference to the accompanying drawings in which:

FIG. 1 is a cross-sectional view of a first embodiment of a pipeline assembly in accordance with the present invention, FIG. 2 is a cross-sectional end view of an alternative embodiment of pipeline assembly, FIG. 3 is a cross-sectional view of an alternative embodiment of a pipeline assembly in accordance with the present invention, FIG. 4 is a cross-sectional view of a further alternative embodiment of a pipeline assembly in accordance with the present invention, and FIGS. 5 and 6 are cross-sectional views of two designs of a further alternative embodiment of a pipeline assembly in accordance With the present invention.

Referring firstly to FIG. 1 of the drawings a pipeline assembly is shown generally at 1. The pipeline assembly 1, is comprised of a pipeline 2, which is lined by a corrosion resistant liner 3, and an annular gap or micro-annulus 4 defined in between the liner 3 and pipeline 2. The corrosion resistant liner is typically made from a plastics material. A venting means 5 is inserted into a pre-drilled hole in the wall of the plastic liner 3. In an alternative arrangement where a relatively thick plastic liner 3 is used, the venting means 5 may be adapted to sit on 'shoulders' within the plastic wall 3 thickness. The pipeline 2 is typically manufactured from carbon steel and transports hydrocarbons, which flow through the inside of the pipeline 10.

The venting means 5 is a pre-fabricated unit which can be inserted into the liner 3 at any time before said liner is fitted into the pipeline 2. Typically the prefabricated venting means 5 is inserted into the predrilled hole of the liner 3 by threading, gluing or fusing. It will be appreciated that the through hole of the venting means 5 has specific design requirements such as diameter, depth and shape to provide the most effective control of corrosion.

As a consequence, the venting means 5 will typically be precision engineered prior to insertion into the liner 3. This prefabrication process allows the through hole 6 of the venting means 5 to be of a more sophisticated design. A further advantage of using a prefabricated venting means is that more thermally and chemically inert materials, such as PEEK or corrosion resistant metals can be used, to ensure performance to specification throughout life.

The venting means 5 acts to preserve the geometric properties of the pre-drilled hole in the liner 3, that is to say, it acts essentially as a hole opener. It will be appreciated that as plastics have typically high coefficients of thermal expansion, large expansion forces occur in the lining 3 as the pipeline 2 warms up. These forces would tend to close any unsupported hole. Similarly, some plastics tend to swell as they absorb water and degrade from exposure to raw hydrocarbon fluids, causing similar hole closure. Thus, the important function of the venting means 5 is to maintain the hole in the liner in an open configuration.

The number of venting means 5 required on the pipeline assembly 1 will vary according to, for example, the length and type of pipeline 2 used. For example the number of vents could range from one vent every 30 to 40 meters of pipeline (that is one vent every few-joints) to one vent every few meters (that is many vents in one joint).

In use the through-hole is engineered to slow the velocity of fluid and minimise "eddies" and vortices at the steel surface, in order to slow the replenishment of the corrosive medium. The through-hole is also designed to prevent any corrosion product from being washed away, thus effectively forming a protective layer to the substrate steel.

The example embodiment of the vent assembly shown in FIG. 1 comprises a main body, with a through hole 6 through which gas molecules can pass. The venting means 5 also comprises a non-return valve 7 having a ball 8 which minimises the amount of product entering the micro-annulus. The valve assembly may also comprise a check means 9 for regulating fluid through the through-hole 6. The check means 9 has a closely controlled porosity and permeability and hence allows the fluid exchange process over the vent assembly to be closely controlled.

In use, the pipeline 2 will be subject to high pressure and temperature, under which conditions the plastic liner will have some permeability to the gas within the hydrocarbon product contained in the pipeline 2. As a result a small quantity of gas can enter the micro-annulus, by virtue of the permeability of the plastic liner 3. The venting means 5 maintains the pre-drilled hole in the liner 3 in an open configuration and therefore allows gas to re-enter the pipeline from the micro-annulus.

The vent assembly embodiment shown in FIGS. 2 and 3, is also located in a pre-drilled hole of a plastic liner in a pipeline and comprises a moveable member 11, typically in the form of a disc, which during normal operation, is pushed against the vent body 12 by the oil pressure within the pipeline. This prevents the product from leaving the inside of the pipeline 10 and entering the micro-annulus 6. However, in the event that the pressure inside the pipeline 10 falls, and there is a corresponding increase in pressure in the micro-annulus 6, a pressure difference will arise across the liner 3, and the gas pressure will push the disc 11 off the vent body 12 and allow gas to flow back into the centre of the pipeline 10. The end of the vent, shown in FIG. 3, is shaped to "catch" the disc 11 when the gas pressure increases and accordingly will prevent the disc 11 from being lost within the contents of the pipeline 10.

It will be appreciated that whilst the embodiments shown in FIGS. 1 to 3 employ non-return valves and moveable members, the vent assembly may comprise a much simpler design.

FIGS. 4 and 5 illustrate such a design, being similar to that shown in FIG. 1 but having no moving parts. The vent assembly shown in FIGS. 4 and 5 simply acts to prevent the hole in the liner 3 from becoming closed under the effects of the pressure and heat of the pipeline contents 10. The hole in the liner 3 is sufficiently small to allow pressure to be relieved through it, however there is no free circulation of corrosive medium behind the liner 3.

The embodiment shown in FIG. 6 is of a similar simple design, but has a check means 9 for regulating fluid flow through the through hole, as described in FIG. 1. Various materials are envisaged for the check means 9, for example sintered metal, sintered wire mesh or porcelain/ceramic type material. Additionally the check means 9 can be made from various plastics and composite materials such as PEEK (Poly Ether Ether Ketone) alloyed with Teflon (PAT). The check means 9 acts as a baffle between the surface requiring protection, that is the carbon steel pipeline 2, and the corrosive product, which typically is the hydrocarbon inside the pipeline 10 and has a closely controlled porosity and permeability which allows the fluid exchange process to be closely controlled.

In a yet further embodiment, and in order to increase the tortuousity of the path between the access point of the corrosive medium and the surface of the steel, it may be desirable to have a number of liners arranged concentrically, each with vent assemblies sufficiently offset to allow the rapid equalisation of pressure but to effectively eliminate free transfer of the corrosive medium between the steel and pipeline contents.

In a still further embodiment an additional plastic sleeve may be provided over the section of plastic pipe containing the vent, so that any product that did travel through the vent would have an additional distance to travel before coming into contact with the steel pipe wall, thus reducing the likelihood of corrosion on the inside of the steel pipe as turbulent fluid straight from the pipe would never be in immediate contact with the steel.

The sleeve would be added after the liner had been swaged to fit the host pipe, but before the liner itself was inserted into the pipe. It is envisaged that the sleeve would be applied by wrapping it around the liner pipe.

The advantage of the present invention lies in the fact that the vent assembly acts to allow gas to flow from the micro-annulus between the pipeline and liner, back into the contents of the pipeline as opposed to venting the gas to the surroundings. As a result there are no emissions from the pipeline. This has both commercial and environmental advantages and pollution of the environment surrounding the pipeline will be greatly reduced.

Although various arrangements of vent assembly have already been discussed it is not envisaged that the examples discussed should be limiting and other possible arrangements will be readily apparent to the skilled engineer. One such arrangement envisaged is that of having the vent shaped as a reed valve. The "vent" would be made by using a chisel to gouge into the liner, creating a sliver of liner which would remain closed until subjected to a pressure difference, which would allow the release of the pressure trapped in the annular gap. The reed valve would be formed on the inside of the plastic liner, at some point prior to its insertion into the steel host pipe.

Modifications and improvements may be made without departing from the scope of the invention herein intended.

The invention claimed is:

1. A pipeline assembly for the transportation of fluid, the pipeline assembly comprising a pipeline, a corrosion resistance plastic liner, and a micro-annulus located between said pipeline and liner, wherein the pipeline assembly also comprises a venting means extending through the corrosion resistance plastic liner, wherein, during transportation of fluid in the center of the pipeline assembly, the venting means allows gas to flow from the micro-annulus into the centre of the pipeline assembly by a flow path wholly internal of the pipeline.

2. A pipeline assembly as claimed in claim 1 wherein the venting means is inserted through an aperture in the plastic liner.

3. A pipeline assembly as claimed in claim 2 wherein the venting means is retained by a shoulder in the wall of the plastic liner.

4. A pipeline assembly as claimed in any one of the preceding claims wherein the venting means is a prefabricated assembly.

5. A pipeline assembly as claimed in claim 1 wherein the venting means is retained in the plastic liner by threading, gluing or fusing.

6. A pipeline assembly as claimed in claim 1 wherein the venting means has check means for regulating fluid flow.

7. A pipeline assembly as claimed in claim 6 wherein said check means is of a construction selected from a group comprising a sintered metal, a sintered wire mesh, a ceramic material, a stainless steel wire mesh, a plastics material and composite materials such as PEEK (Poly Ether Ether Ketone) alloyed with Teflon®.

8. A pipeline assembly as claimed in claim 1 wherein the venting means includes non-return valve means.

9. A pipeline assembly as claimed in claim 8 wherein the non-return valve means comprises a spring biased ball valve assembly.

10. A pipeline assembly as claimed in claim 8 wherein the valve means comprises a moveable member which is moveable between a first and second position, wherein the moveable member is in the first position when the pressure within the pipeline exceeds a set level, and wherein the moveable member is in the second position when the pressure within the pipeline falls below said set level, wherein in the first position the moveable member prevents the pipeline contents from exiting the pipeline and wherein in the second position the moveable member permits the flow of gas into the pipeline.

11. A pipeline assembly as claimed in claim 1 wherein the venting means comprises a reed valve arrangement formed directly in the liner.

12. A pipeline assembly as claimed in claim 1 wherein a sleeve member extends circumferentially around the liner and longitudinally on either side of the venting means so as to define a lengthened venting path between the micro annulus and the centre of the pipeline assembly.

13. A pipeline assembly as claimed in claim 1 wherein the fluid is a hydrocarbon.

14. A pipeline assembly as claimed in claim 13 wherein the hydrocarbon comprises a liquid phase and a gas phase.

15. A pipeline assembly as claimed in claim 14 wherein the venting means is adapted for transporting the gas phase by the flow path.

16. A method of forming a pipeline assembly from a pipeline and a corrosion resistant plastic liner, the method comprising the sequential steps of:
providing a through hole in the corrosion resistant plastic liner;
inserting a pre-fabricated venting means into the through hole in the corrosion resistant plastic liner; and
inserting the corrosion resistant plastic liner into a pipeline such that, during transportation of fluid in the center of the pipeline assembly, the venting means allows gas to flow from a micro-annulus located between said pipeline and corrosion resistant liner into the centre of the pipeline assembly.

17. The method as claimed in claim 16, comprising the additional step of threading the venting means in a pre-drilled hole.

18. The method as claimed in claim 16, comprising the additional step of gluing the venting means in a pre-drilled hole.

19. The method as claimed in claim 16, comprising the additional step of fusing the venting means in a pre-drilled hole.

20. A pipeline assembly formed by the method of claim 16.

* * * * *